United States Patent
Victor et al.

(10) Patent No.: US 11,398,961 B2
(45) Date of Patent: Jul. 26, 2022

(54) METHODS AND SYSTEMS FOR MANAGING EDGE WEB SERVICES

(71) Applicant: Iotium, Inc., Milpitas, CA (US)

(72) Inventors: Ron Victor, Los Gatos, CA (US);
Dhawal Tyagi, Saratoga, CA (US);
Srivatsan Rajagopal, Cupertino, CA (US); Dhruva Narasimhan, Chennai (IN)

(73) Assignee: IOTIUM, INC., Milpitas, CA (US)

( * ) Notice: Subject to any disclaimer, the term of this patent is extended or adjusted under 35 U.S.C. 154(b) by 0 days.

(21) Appl. No.: 16/796,924

(22) Filed: Feb. 20, 2020

(65) Prior Publication Data

US 2020/0396143 A1 Dec. 17, 2020

Related U.S. Application Data

(60) Provisional application No. 62/808,303, filed on Feb. 21, 2019.

(51) Int. Cl.
*H04L 41/5067* (2022.01)
*H04L 67/00* (2022.01)
*G06F 11/30* (2006.01)

(52) U.S. Cl.
CPC ...... *H04L 41/5067* (2013.01); *G06F 11/3048* (2013.01); *H04L 67/34* (2013.01)

(58) Field of Classification Search
CPC ... H04L 41/5067; H04L 67/34; G06F 11/3048
See application file for complete search history.

(56) References Cited

U.S. PATENT DOCUMENTS

| | | | | |
|---|---|---|---|---|
| 9,389,916 | B1* | 7/2016 | Miller | G06F 11/3433 |
| 10,382,558 | B2* | 8/2019 | Choi | H04L 47/822 |
| 10,708,281 | B1* | 7/2020 | Modalavalasa | H04N 21/2396 |
| 10,868,773 | B2* | 12/2020 | Tiwary | H04L 47/822 |
| 11,080,168 | B1* | 8/2021 | Choudhury | G06F 11/22 |
| 2012/0215779 | A1* | 8/2012 | Lipstone | H04L 67/22 707/737 |
| 2016/0094363 | A1* | 3/2016 | Ravi | G06F 21/57 370/401 |
| 2017/0034643 | A1* | 2/2017 | Young | H04W 4/70 |
| 2018/0047074 | A1* | 2/2018 | Cronin | G06Q 30/04 |
| 2018/0139726 | A1* | 5/2018 | Choi | H04L 67/1082 |
| 2018/0198818 | A1* | 7/2018 | Andrews | H04L 67/12 |

(Continued)

OTHER PUBLICATIONS

Yu, "Computation Offloading with Data Caching for Mobile Edge Computing", Nov. 2018.*

(Continued)

*Primary Examiner* — Todd L Barker
(74) *Attorney, Agent, or Firm* — Weaver Austin Villeneuve & Sampson LLP; Brian D. Griedel; Ryan Otis

(57) ABSTRACT

In one aspect, a computerized method for implementing edge web services includes the step of providing an edge device. The edge device is provided for free to a customer. The method includes the step of monitoring a usage on the edge device by the customer. The method includes the step of charging an edge-device entity based on the usage of the edge device and an application in the edge device. An orchestrator communicates the edge device usage statistics to an enterprise system that provided the edge device to the customer.

11 Claims, 2 Drawing Sheets

(56) References Cited

U.S. PATENT DOCUMENTS

| | | | | |
|---|---|---|---|---|
| 2018/0316608 A1* | 11/2018 | Dowlatkhah | ......... | H04L 41/509 |
| 2019/0156445 A1* | 5/2019 | Markham | .............. | G06Q 30/04 |
| 2019/0208007 A1* | 7/2019 | Khalid | .................. | G06F 16/178 |
| 2019/0373472 A1* | 12/2019 | Smith | ................... | H04L 9/3239 |
| 2020/0007460 A1* | 1/2020 | Guim Bernat | ........ | G06F 9/5011 |
| 2020/0050494 A1* | 2/2020 | Bartfai-Walcott | .... | G06F 9/5083 |

OTHER PUBLICATIONS

Maladrino, "How Close to the Edge? Delay/Utilization Trends in MEC", Dec. 12, 2016.*
Villari et al., "Osmotic Computing: A New Paradigm for Edge/Cloud Integration", IEEE Cloud Computing, Dec. 30, 2016, IEEE Publishing.*
Baktir et al., "How Can Edge Computing Benefit From Software-Defined Networking: A Survey, USe Cases, and Future Directions", IEEE Communications Surveys & Tutorials, vol. 19, Issue 4, Jun. 20, 2017, IEEE Publishing.*
Bumgardner et al., "Edge-enabled Distributed Network Measurement", 2018 IEEE International Conference on Pervasive Computing and Communications Workshops, Mar. 19, 2018, IEEE Publishing.*

* cited by examiner

METHODS AND SYSTEMS FOR MANAGING EDGE WEB SERVICES

CROSS-REFERENCE TO RELATED APPLICATIONS

This application is a continuation in part of U.S. Patent Provisional Application No. 62/808,303, titled METHODS AND SYSTEMS FOR MANAGING EDGE WEB SERVICES and filed on 21 Feb. 2019. This application is hereby incorporated by reference in its entirety.

FIELD OF THE INVENTION

The invention is in the field of web services and more specifically to a method, system and apparatus for managing edge web services.

DESCRIPTION OF THE RELATED ART

Currently, edge device are used provides an entry point into enterprise or service provider core networks. Example edge devices include, inter alia: routers, routing switches, integrated access devices (IADs), multiplexers, and a variety of metropolitan area network (MAN) and wide area network (WAN) access devices. Edge devices can also provide connections into carrier and service provider networks.

At the same time, web service enterprises are utilized to provide a low cost, reliable, and secure foundations customers as they build and deliver Software as a Service (SaaS) solutions. These are often provided on a metered pay-as-you-go basis. Accordingly, opportunities exist to improve the model of delivery and management of edge devices based on the web service enterprise model.

BRIEF SUMMARY OF THE INVENTION

In one aspect, a computerized method for implementing edge web services includes the step of providing an edge device. The edge device is provided for free to a customer. The method includes the step of monitoring a usage on the edge device by the customer. The method includes the step of charging an edge-device entity based on the usage of the edge device and an application in the edge device. An orchestrator communicates the edge device usage statistics to an enterprise system that provided the edge device to the customer.

Figure 1:
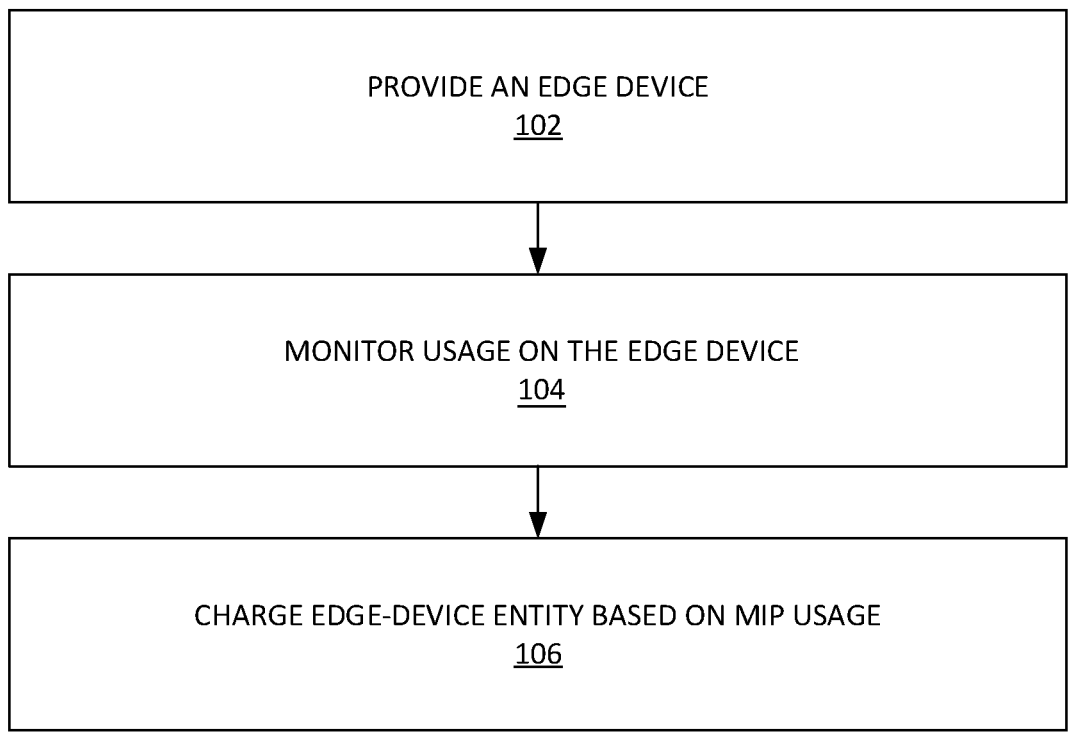
FIG. 1 illustrates an example process for implementing edge web services, according to some embodiments.

The Figures described above are a representative set and are not an exhaustive with respect to embodying the invention.

DESCRIPTION

Disclosed are a system, method, and article of manufacture for managing edge web services. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Edge device is a device which provides an entry point into enterprise or service provider core networks. Examples edge devices can include, inter alia: routers, routing switches, integrated access devices (IADs), multiplexers, other network access devices, user computing devices (e.g. laptops, smartphones, personal computers, etc.), etc. An edge device can also provide connection into a carrier and/or service provider network.

MIPS (million instructions per second) is a measure of computing performance and/or the cost of computing.

Orchestrator can be a management portal for a computer network. An orchestrator can be used for implementing various functionalities such as, inter alia: edge-device configuration, monitoring MIP usage of edge-device and/or edge-device applications, edge-device testing, edge-device troubleshooting, provision services for edge-devices, analyzing application performance, etc.

SD-WAN is an acronym for software-defined networking in a wide area network (WAN).

Example Methods

The example methods and systems herein provide for the provision and management of edge web services. An edge device can be provided to a customer entity for free or a low cost by an enterprise. The enterprise can then monitor the customer's use of the edge device and charge the customer for only the use of the edge device. The use of the edge device can be in terms of MIPS, edge device memory usages, bytes of network traffic, etc.

FIG. 1 illustrates an example process 100 for implementing edge web services, according to some embodiments. Process 100 can be used to provides on-demand edge devices and/or edge-device based applications and/or services to customers (e.g. individuals, companies, governments, etc.) on a usage basis. The applications and services can include operating systems; networking; pre-loaded application software (e.g. web servers, databases, CRM, third-party applications (e.g. desktop applications), microservices, etc.).

More specifically, in step 102, process 100 can provide an edge device. The edge device can be provided for free to a customer. The edge device can include/run various applications, micro services, and the like. The edge device can interact with an orchestrator (e.g. orchestrator 206 of FIG. 2 infra).

In step 104, process 100 can monitor usage on the edge device. Step 104 can monitor usage of, inter alia: MIPs, CPU(s) for processing, GPU(s) for processing, local/RAM memory, hard-disk/SSD storage, network usage, SD-Wan usage, etc. In one example, an SD-WAN can be provided. Use of the SD-WAN by the edge device can be monitored and the customer can be charged accordingly. In some examples, the orchestrator can monitor the usage of the edge device.

In step 106, process 100 can charge edge-device entity based on the usage of the edge device and/or applications in the edge device. The orchestrator can communicate the edge device usage statistics to an enterprise that provided the edge device to the customer. It is noted that the enterprise can charge the customer various respective rates for various services. For example, the usage rate for the SD-WAN can be higher than utilizing an HTTPS communication over a computer network (e.g. computer network 202). The SD-WAN charge can be on a per byte basis.

Example Systems

Figure 2:
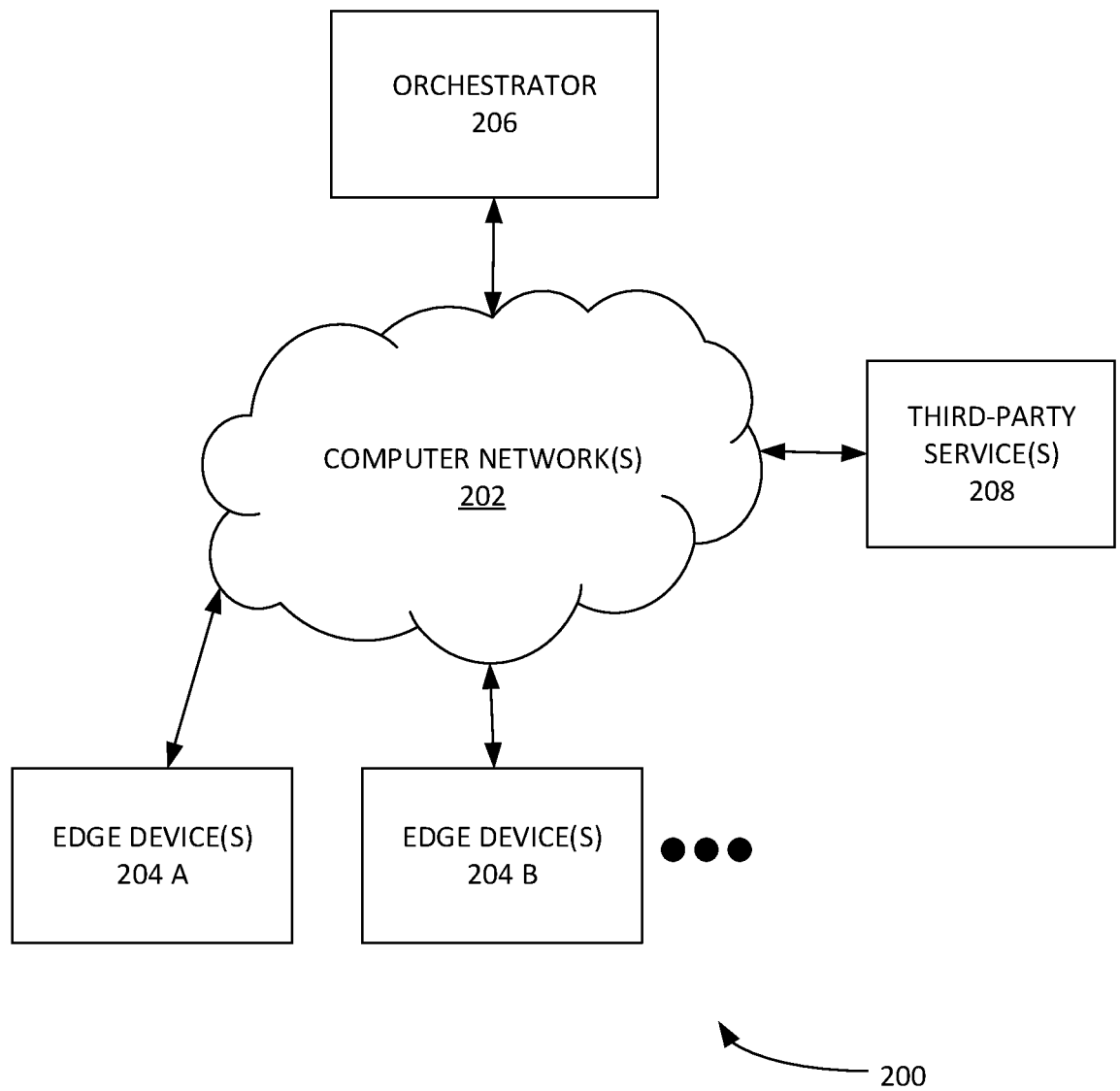
FIG. 2 illustrates an example edge web services system, according to some embodiments.

FIG. 2 illustrates an example edge web services system 200, according to some embodiments. System 200 can provide edge-device usage-based billing in a distributed computing environment. System 200 can include computer networks 202. Computer networks 202 can include the Internet, cellular data networks, local area networks, wide area networks, enterprise networks, etc. In one example, system 200 can include an SD-WAN network.

Orchestrator 206 can a management portal for computer network 202. Orchestrator 206 can be used for implementing various functionalities such as, inter alia: edge-device configuration, monitoring MIP usage of edge-device and/or edge-device applications, edge-device testing, edge-device troubleshooting, provision services for edge-devices, analyzing application performance, etc. Orchestrator 206 can communicate relevant information to an enterprise system for analysis and subsequent charging of a customer.

Edge devices 204 A-B can interact with an orchestrator. Orchestrator 206 can monitor the usage statistics of the edge device and/or edge-device related applications/micro services. Orchestrator 206 can be utilized to push various applications to the edge device.

Third parties can use third-party server 208 to push applications to edge devices 204 A-B via orchestrator 206. The customer does not need to purchase a license for the applications.

In some embodiments, the elements of system 200 can be implemented as cloud-based versions thereof. Furthermore, other elements and aspects of an SD-WAN (e.g. an orchestration layer, control layer, data layer, etc.) can be included in system 200.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method for implementing edge web services comprising:
   providing an edge device to a customer, wherein:
      the edge device is communicatively coupled with one or more computer networks, and
      the edge device comprises a network access device providing a connection into a carrier and/or service provider network;
   configuring the edge device with an orchestrator, wherein:
      the orchestrator comprises a management portal communicatively coupled with the edge device via the one or more computer networks;
      the orchestrator pushes an edge-device application to the edge device;
      the orchestrator configures the edge device to execute the edge-device application comprising:
         an operating system,
         a networking application,
         a pre-loaded web server or database,
         a desktop application, or
         a microservice; and
      the orchestrator is configured to implement:
         testing of the edge device,
         troubleshooting of the edge device,
         provisioning services for the edge device, and
         analysis of performance of the edge-device application;
   monitoring, with the orchestrator, usage of the edge device in executing the edge-device application, the usage regarding:

a central processing unit (CPU),
a graphics processing unit (GPU),
a local random access memory (RAM),
a SD-Wan (software-defined networking in a wide area network),
a hard-disk storage, and
a network;
reporting, with the orchestrator via the one or more computer networks, usage data regarding the edge device, the edge-device application, or both, wherein:
the usage data is based at least in part on the monitored usage,
the usage data comprises edge device usage statistics, and
the usage data is reported to an enterprise system; and
charging an edge-device entity based on the usage of the edge device in running the edge-device application.

2. The method of claim 1 wherein:
the edge device comprises an on-demand edge device provided on a usage basis.

3. The method of claim 1, wherein providing the edge device to the customer comprises providing the edge device for free to the customer.

4. The method of claim 1, wherein the edge-device application comprises an on-demand edge-device application provided on a usage basis.

5. The method of claim 1, wherein charging the edge-device entity based on the usage of the edge device comprises charging different rates for different types of usage.

6. The method of claim 1, wherein the one or more computer networks comprise the internet, a cellular data network, a local area network, a wide area network, an enterprise network, or a combination thereof.

7. A non-transitory machine-readable medium storing instructions for implementing edge web services, the instructions comprising code for:
communicating with an edge device provided to a customer, wherein:
the edge device is communicatively coupled with one or more computer networks, and
the edge device comprises a network access device providing a connection into a carrier and/or service provider network;
configuring the edge device with an orchestrator, wherein:
the orchestrator comprises a management portal communicatively coupled with the edge device via the one or more computer networks;
the orchestrator pushes an edge-device application to the edge device;
the orchestrator configures the edge device to execute the edge-device application comprising:
an operating system,
a networking application,
a pre-loaded web server or database,
a desktop application, or
a microservice; and
the orchestrator is configured to implement:
testing of the edge device,
troubleshooting of the edge device,
provisioning services for the edge device, and
analysis of performance of the edge-device application;
monitoring, with the orchestrator, usage of the edge device in executing the edge-device application, the usage regarding:
a central processing unit (CPU),
a graphics processing unit (GPU),
a local random access memory (RAM),
a SD-Wan (software-defined networking in a wide area network),
a hard-disk storage, and
a network;
reporting, with the orchestrator via the one or more computer networks, usage data regarding the edge device, the edge-device application, or both, wherein:
the usage data is based at least in part on the monitored usage,
the usage data comprises edge device usage statistics, and
the usage data is reported to an enterprise system; and
charging an edge-device entity based on the usage of the edge device in running the edge-device application.

8. The non-transitory machine-readable medium of claim 7, wherein the code for monitoring providing the edge device to the customer comprises code for providing the edge device for free to the customer.

9. The non-transitory machine-readable medium of claim 7, wherein the code for charging the edge-device entity based on the usage of the edge device comprises charging different rates for different types of usage.

10. An orchestrator for implementing edge web services, the orchestrator configured to:
communicate with an edge device provided to a customer, wherein:
the edge device is communicatively coupled with one or more computer networks, and
the edge device comprises a network access device providing a connection into a carrier and/or service provider network;
configure the edge device, wherein:
the orchestrator comprises a management portal communicatively coupled with the edge device via the one or more computer networks;
the orchestrator pushes an edge-device application to the edge device;
the orchestrator configures the edge device to execute the edge-device application comprising:
an operating system,
a networking application,
a pre-loaded web server or database,
a desktop application, or
a microservice; and
the orchestrator is configured to implement:
testing of the edge device,
troubleshooting of the edge device,
provisioning services for the edge device, and
analysis of performance of the edge-device application;
monitor usage of the edge device in executing the edge-device application, the usage regarding:
a central processing unit (CPU),
a graphics processing unit (GPU),
a local random access memory (RAM),
a SD-Wan (software-defined networking in a wide area network),
a hard-disk storage, and
a network;
report, via the one or more computer networks, usage data regarding the edge device, the edge-device application, or both, wherein:
the usage data is based at least in part on the monitored usage,
the usage data comprises edge device usage statistics, and the usage data is reported to an enterprise system; and cause an edge-device entity to be charged based on the usage of the edge device in running the edge-device application.

11. The orchestrator of claim 10, wherein, to provide the edge device to the customer, the orchestrator is configured to provide the edge device for free to the customer.

* * * * *